C. BELL.
SUCKER ROD JOINT.
APPLICATION FILED JULY 14, 1919.
1,348,692.
Patented Aug. 3, 1920.
2 SHEETS—SHEET 1.
Fig. 1.
Fig. 2.
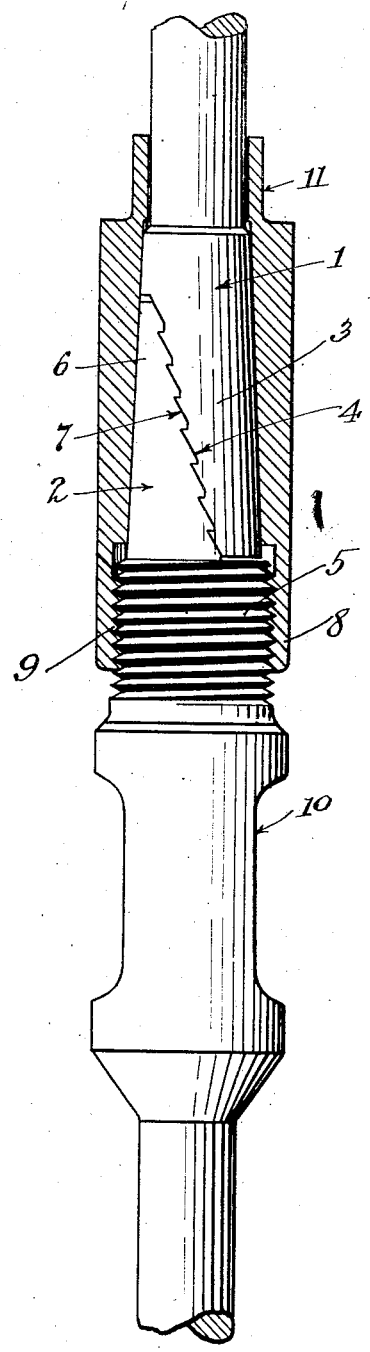
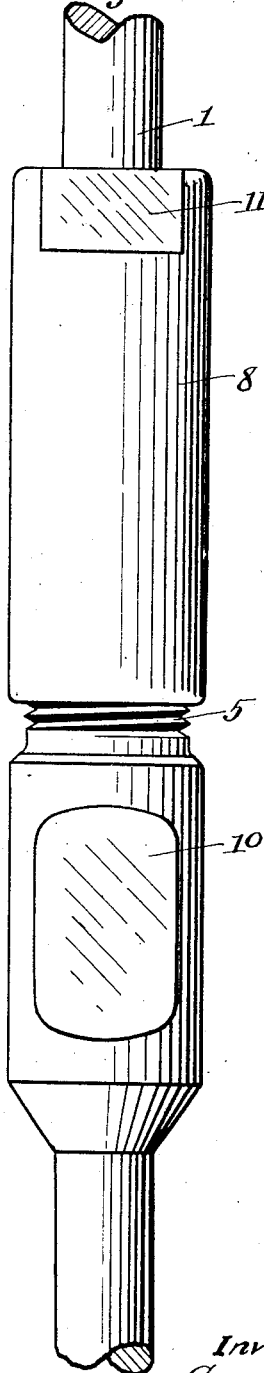
Inventor
Cyrus Bell,
By Frederick W. Ryan
Atty.

C. BELL.
SUCKER ROD JOINT.
APPLICATION FILED JULY 14, 1919.
1,348,692.
Patented Aug. 3, 1920.
2 SHEETS—SHEET 2.
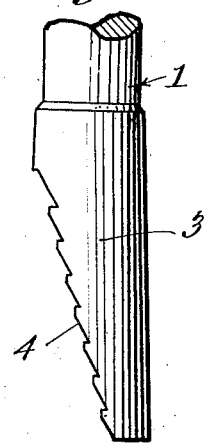
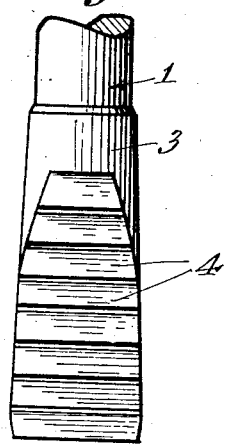
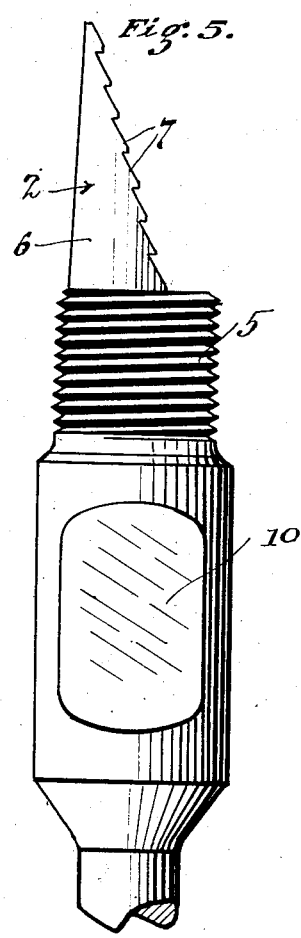
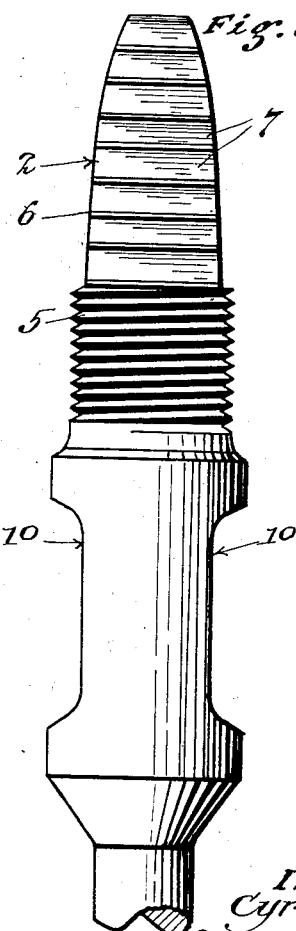
Inventor
Cyrus Bell.

UNITED STATES PATENT OFFICE.

CYRUS BELL, OF WHITTIER, CALIFORNIA.

SUCKER-ROD JOINT.

1,348,692. Specification of Letters Patent. Patented Aug. 3, 1920.

Application filed July 14, 1919. Serial No. 310,757.

*To all whom it may concern:*

Be it known that I, CYRUS BELL, a citizen of the United States, residing at Whittier, in the county of Los Angeles, State of California, have invented a new and useful Sucker-Rod Joint, of which the following is a specification.

My invention relates to a joint for sucker rods and the like.

An object of my invention is to provide a joint for sucker rods and the like which will be capable of withstanding a maximum strain and will be durable in construction.

Another object is to provide a joint for sucker-rods with the ends of the coöperating rod sections formed to provide interengaging serrations providing substantially transverse abutment table surfaces, and having tapered peripheral surfaces, the peripheral surface of one rod section divergingly tapered toward its terminal end and the peripheral surface of the coöperating section convergingly tapered toward its terminal end and provided with a screw-threaded portion for coöperation with a screw-threaded portion of a binding sleeve having a tapered bore engaging the tapered peripheral surfaces of both sections for wedging the interengaging serrated surfaces in tight engagement and for drawing the two sections together.

Another object of my invention is to provide a joint of the character referred to which will not depend upon threads to withstand the longitudinal strain upon the string of sucker rods, excepting under excessive strains as would tend to shear off the teeth of the intermeshing angled surfaces, in which case the threads assume the load.

Another object of my invention is to provide a joint of the character referred to which will be simple and convenient in operation and economical in manufacture.

Other objects and advantages will appear from the subjoined description, it being understood that while I will hereinafter set forth a preferred form of my invention the same is not limited to such preferred form.

The accompanying drawings illustrate a preferred form of my invention.

Figure 1 is a perspective of two sucker rod sections coupled together by my joint, the sleeve for the same being in longitudinal section.

Fig 2 is a perspective view of the same, the sleeve being illustrated in full.

Fig. 3 is a side view of one end of a sucker rod constructed in accordance with the preferred form of my invention.

Fig. 4 is a view taken from another angle of the end of the sucker rod illustrated in Fig. 3.

Fig. 5 is a side view illustrating the opposite end of the sucker rod illustrated in Figs. 3 and 4.

Fig. 6 is a view taken from another angle of the end of the sucker rod illustrated in Fig. 5.

Referring to the drawings there are illustrated two sucker rod sections 1 and 2.

The end portion 3 of the sucker rod 1 is serrated as at 4.

The sucker rod 2 is threaded as at 5 and terminates in an end portion 6 serrated as at 7 and adapted to interengage with the serrated portion of the rod 1.

A binding sleeve 8 is threaded at 9 to receive the thread 5 of the section 2. When the thread 9 engages the thread 5 the sleeve 8 engages the end portions 3 and 6 of the rods 1 and 2, thus securing the serrations 4 and 7 in interengaging relation.

In practice the rod 2 is formed with a tool square 10 and the sleeve 8 with a tool square 11, the squares 10 and 11 being utilized to position the sleeve 8 to complete the coupling of the rods 1 and 2.

In the preferred form of my invention the end portion 3 of the rod 1 is cut downwardly and outwardly and the serrations 4 take the form of stepped teeth. Similarly the end portion 6 of the rod 2 is cut upwardly and outwardly and the serrations 7 take the form of stepped teeth.

In the preferred form of my invention the circumferences of the end portions 3 and 6 are preferably tapered as illustrated particularly in Fig. 1. The sleeve 8 is correspondingly inwardly tapered to receive the tapered end portions 3 and 6. Thus when the sleeve 8 is threaded upon the rod 2, the said taper will cause a wedging of the end portions 3 and 6 within the sleeve, effectively securing the serrations 4 and 7 in interengaging relation.

It is understood that each sucker rod section is formed at one end with one portion of my joint and at its opposite end with the other portion.

In operation the sections of sucker rod are coupled by interengaging the respective serrations 4 and 7. The sleeve 8 is then threaded onto the thread 5. The sleeve 5 will by contact with the end portions 3 and 6 prevent the serrations 4 and 7 from moving laterally so as to become disengaged.

The said interengaging serrations may be formed with any desired amount of stock to withstand any strain the same may be subject to, and may be of any desired number or shape, but preferably each tooth is formed with a substantially flat transverse face, as an abutment table surface, to which the longitudinal strains will be transmitted, or a flat surface which is disposed at an angle, to the horizontal, which is no greater than the angle of repose, so that no transverse cam action will be produced between the rod ends during an upward working stroke of the rod.

Under normal conditions the entire longitudinal strain on the coupled sucker-rods will be borne by the abutment table surfaces of the coöperating serrated surfaces, and the binding sleeve serves to transversely wedge the sections tightly together, and by its threaded engagement with the one section serves to draw the two sections together longitudinally.

If the rod sections are subjected to excessive strains such as would tend to shear off the teeth of the coöperating rod ends, the screw-threads, as additional load bearing elements assume such portion of said strain as to safeguard against a shearing off of the teeth.

In deep wells the total weight of a string of sucker-rod sections may be in excess of 3000 pounds, and it is therefore of vital importance that all free play between any two sections be entirely eliminated and said sections be tightly wedged and drawn together to be equally as rigid as a single integral rod. The binding sleeve of the present structure, acting against the tapered peripheral surface of one section and the threaded portion of the adjacent section exerts a powerful longitudinal pull to draw the sections axially toward each other and the tapered bore coöperating with the tapered peripheral surfaces of both sections exerts a powerful transverse wedging action to tightly clamp the two sections together.

I claim:

1. The combination of sucker-rod sections having intermeshing transverse surfaces formed at their adjoining ends and contoured to form, when said surfaces are intermeshed, a tapered cylindrical rod portion having a screw-thread at its larger end, and a sleeve having a tapered bore engaging said tapered rod portion and having an internal screw-thread at the larger end of said bore engaging the screw-threaded portion of the rod.

2. The combination of sucker rod sections having intermeshing transverse surfaces formed at their adjoining ends, one section having a peripheral surface tapered longitudinally from its terminal end to a rod portion of smaller diameter, the adjacent section having a peripheral surface correspondingly externally tapered longitudinally from a rod portion of larger diameter to its terminal end and having a threaded portion adjacent the tapered surface, and a sleeve having a tapered bore engaging the tapered peripheral surfaces of both sections and a screw-thread engagement with the thread portion of the one section.

Signed at Whittier, California, this 7th day of July 1919.

CYRUS BELL.

Witnesses:
H. M. SHAPPELL,
E. B. GREENOUGH.